United States Patent

Hirotsune et al.

(10) Patent No.: US 10,276,192 B2
(45) Date of Patent: Apr. 30, 2019

(54) PERPENDICULAR MAGNETIC RECORDING MEDIUM

(71) Applicant: Western Digital Technologies, Inc., Irvine, CA (US)

(72) Inventors: Akemi Hirotsune, Kanagawa (JP); Ikuko Takekuma, Kanagawa (JP); Junichi Sayama, Kanagawa (JP)

(73) Assignee: Western Digital Technologies, Inc., San Jose, CA (US)

( * ) Notice: Subject to any disclaimer, the term of this patent is extended or adjusted under 35 U.S.C. 154(b) by 105 days.

(21) Appl. No.: 13/940,132

(22) Filed: Jul. 11, 2013

(65) Prior Publication Data

US 2015/0017480 A1  Jan. 15, 2015

(51) Int. Cl.

| G11B 5/66 | (2006.01) |
|---|---|
| G11B 5/31 | (2006.01) |
| G11B 5/48 | (2006.01) |
| G11B 5/73 | (2006.01) |
| G11B 5/00 | (2006.01) |

(52) U.S. Cl.
CPC .......... *G11B 5/314* (2013.01); *G11B 5/4866* (2013.01); *G11B 5/7325* (2013.01); *G11B 2005/0021* (2013.01)

(58) Field of Classification Search
CPC ............... G11B 5/732; G11B 5/7325; G11B 2005/0021; G11B 5/314; G11B 5/4866
USPC .............................................. 428/831.2, 827
See application file for complete search history.

(56) References Cited

U.S. PATENT DOCUMENTS

| 8,279,739 B2 | 10/2012 | Kanbe et al. | |
|---|---|---|---|
| 8,945,732 B1* | 2/2015 | Yuan | G11B 5/65 428/828 |
| 2005/0196649 A1* | 9/2005 | Inamura | G11B 5/65 428/845.5 |
| 2005/0244679 A1* | 11/2005 | Arai | G11B 5/667 428/828 |
| 2009/0080109 A1* | 3/2009 | Fukuzawa | B82Y 10/00 360/122 |
| 2009/0147403 A1* | 6/2009 | Araki | G11B 5/65 360/135 |
| 2010/0046116 A1* | 2/2010 | Shimizu | G11B 5/66 360/110 |
| 2010/0182714 A1 | 7/2010 | Kanbe et al. | |
| 2012/0026626 A1* | 2/2012 | Nolan | G11B 5/66 360/135 |

(Continued)

FOREIGN PATENT DOCUMENTS

| JP | 2009158054 A | * 7/2009 |
|---|---|---|
| JP | 2010129263 A | 6/2010 |

(Continued)

OTHER PUBLICATIONS

English Machine Translation: Suzuki (JP 2009-158054).*

(Continued)

*Primary Examiner* — Holly C Rickman
*Assistant Examiner* — Linda N Chau
(74) *Attorney, Agent, or Firm* — Foley & Lardner LLP

(57) ABSTRACT

A magnetic recording medium includes an amorphous buffer layer, a hybrid layer including a barrier layer, and a texture control layer. The magnetic recording medium also includes a heat sink layer, an under layer, and a perpendicular recording layer.

15 Claims, 10 Drawing Sheets

(56) References Cited

U.S. PATENT DOCUMENTS

| | | | |
|---|---|---|---|
| 2012/0099220 A1* | 4/2012 | Tamai et al. | 360/75 |
| 2012/0113768 A1* | 5/2012 | Kanbe et al. | 369/13.24 |
| 2012/0141835 A1* | 6/2012 | Sakamoto | 428/831 |
| 2012/0154948 A1* | 6/2012 | Tamai | G11B 5/65 360/75 |
| 2012/0194942 A1* | 8/2012 | Hohlfeld | G11B 5/3133 360/59 |
| 2012/0207003 A1* | 8/2012 | Kanbe et al. | 369/13.33 |
| 2012/0251845 A1* | 10/2012 | Wang | G11B 5/66 428/827 |
| 2013/0258523 A1* | 10/2013 | Maeda | G11B 5/667 360/110 |
| 2014/0072828 A1* | 3/2014 | Inaba | G11B 5/645 428/831 |

FOREIGN PATENT DOCUMENTS

| | | |
|---|---|---|
| JP | 2011-060344 | 3/2011 |
| WO | 2010109822 A1 | 9/2010 |

OTHER PUBLICATIONS

Statement of Relevance of Non-Translated Foreign Document WO2010109822.
Japanese Office Action, Applicaiton No. 2014-141249, dated Apr. 27, 2015, 2 Pages.

* cited by examiner

Barrier Layer: 0 nm 0.5 nm 0.7 nm 1.0 nm 1.2 nm 1.5 nm

PERPENDICULAR MAGNETIC RECORDING MEDIUM

BACKGROUND

In conventional systems, to utilize L10 type FePt ordered alloy as a magnetic recording material, the exchange interaction between crystal lattices is reduced. Granularization of L10 type FePt ordered alloy is provided by adding a non-magnetic material such as SiO2 or C or the like. In general, granularization refers to creating a structure in which the FePt alloy is the main component, but the crystal grain boundaries are formed by non-magnetic material that surrounds the magnetic crystal grains made from FePt, so that the magnetic crystal grains are separated.

Also, utilizing FePt alloy having an L10 type crystal structure in a magnetic recording layer, the FePt layer has a (001) orientation. A (001) orientation can be formed by using an appropriate material in the underlayer formed below the FePt layer. For example, utilizing a MgO underlayer, the FePt layer is given a (001) orientation.

Furthermore, in some conventional systems, for ordering the FePt and forming the (001) orientation, it is necessary to perform a process of heating to 300 C or higher during film making or before and after.

In order to use FePt alloy having an L10 type crystal structure in a magnetic recording layer, it is necessary to form an MgO underlayer, and heat the FePt layer thereupon in order to order the FePt layer and provide the (001) orientation. In thermal assist recording and reproduction, in order to obtain a high SN ratio (SNR) and a narrow recording width, it is necessary to provide a heat sink layer below the MgO underlayer and to dissipate the excess hear during recording and after recording in the direction of the substrate. Preferably the heat sink layer is made from a material with a bcc structure such as Cr or the like, whose crystal orientation planes conform to those of the MgO underlayer, and that has a thermal conductivity larger than the MgO underlayer. However, if a Cr film is formed directly on the substrate or on an adhesion layer, the (110) orientation is dominant, and it is difficult to obtain the (100) orientation to conform to the MgO crystal orientation. On the other hand, if a thin oxide film such as MgO or the like is formed on the adhesion layer in order to obtain the (100) orientation of Cr on the substrate or on the adhesion layer, the (100) orientation can be obtained, but projections are formed on the Cr surface. When these surface projections are formed, the FePt layer formed on the MgO is affected, so ultimately projections are formed on the surface of the FePt layer, so the flying characteristics deteriorate significantly.

Accordingly, in conventional systems, for FePt alloy media having an L10 type crystal structure, even if a heat sink layer is formed, it is not possible to obtain a medium in which the MgO underlayer and the FePt layer have the desired crystal orientation and sufficient flying characteristics.

BRIEF DESCRIPTION OF THE DRAWINGS

The accompanying drawings, which are incorporated in and form a part of this application, illustrate embodiments of the present invention, and together with the description, serve to explain the principles of the invention. Unless noted, the drawings referred to in this description should be understood as not being drawn to scale. It should be noted that a break in a line in the drawings referred to in this description signifies that a line and the perpendicular line(s) crossing it do not connect.

DESCRIPTION OF EMBODIMENTS

Reference will now be made in detail to various embodiments, examples of which are illustrated in the accompanying drawings. While the subject matter will be described in conjunction with these embodiments, it will be understood that they are not intended to limit the subject matter to these embodiments. Furthermore, in the following description, numerous specific details are set forth in order to provide a thorough understanding of the subject matter. In other instances, conventional methods, procedures, objects, and circuits have not been described in detail as not to unnecessarily obscure aspects of the subject matter.

As will be described in further detail below, embodiments of the present invention relates to a perpendicular (or vertical) magnetic recording medium, and more particularly relates to a magnetic recording medium having a surface recording density of 1 terabit per square inch or higher and a magnetic storage apparatus using same.

In order to increase surface recording density while maintaining thermal stability, a magnetic recording layer having a high vertical magnetic anisotropy energy Ku may be utilized. L10 type FePt ordered alloy is a material with a higher vertical magnetic anisotropy energy Ku compared with current CoCrPt alloys.

In contrast to the conventional systems, as described above, in one embodiment, the vertical magnetic recording medium includes a buffer layer having at least an amorphous or bcc crystal structure, a hybrid layer, a heat sink layer, an underlayer, a vertical magnetic recording layer having an L10 type crystal structure, and a protective layer laminated sequentially on a substrate, and the hybrid layer includes a barrier layer and a texture control layer.

By providing the hybrid layer, the surface projections are suppressed even though the heat sink is provided, and the crystal orientation of the underlayer and the orientation of the FePt layer is sufficient. Accordingly, it is possible to obtain a FePt medium in which the flying characteristics are improved, and heat dissipation towards the substrate during recording are sufficient.

Also, because the proper heat dissipation, the recording width during recording can be narrowed, and high density recording is enabled.

Figure 1:
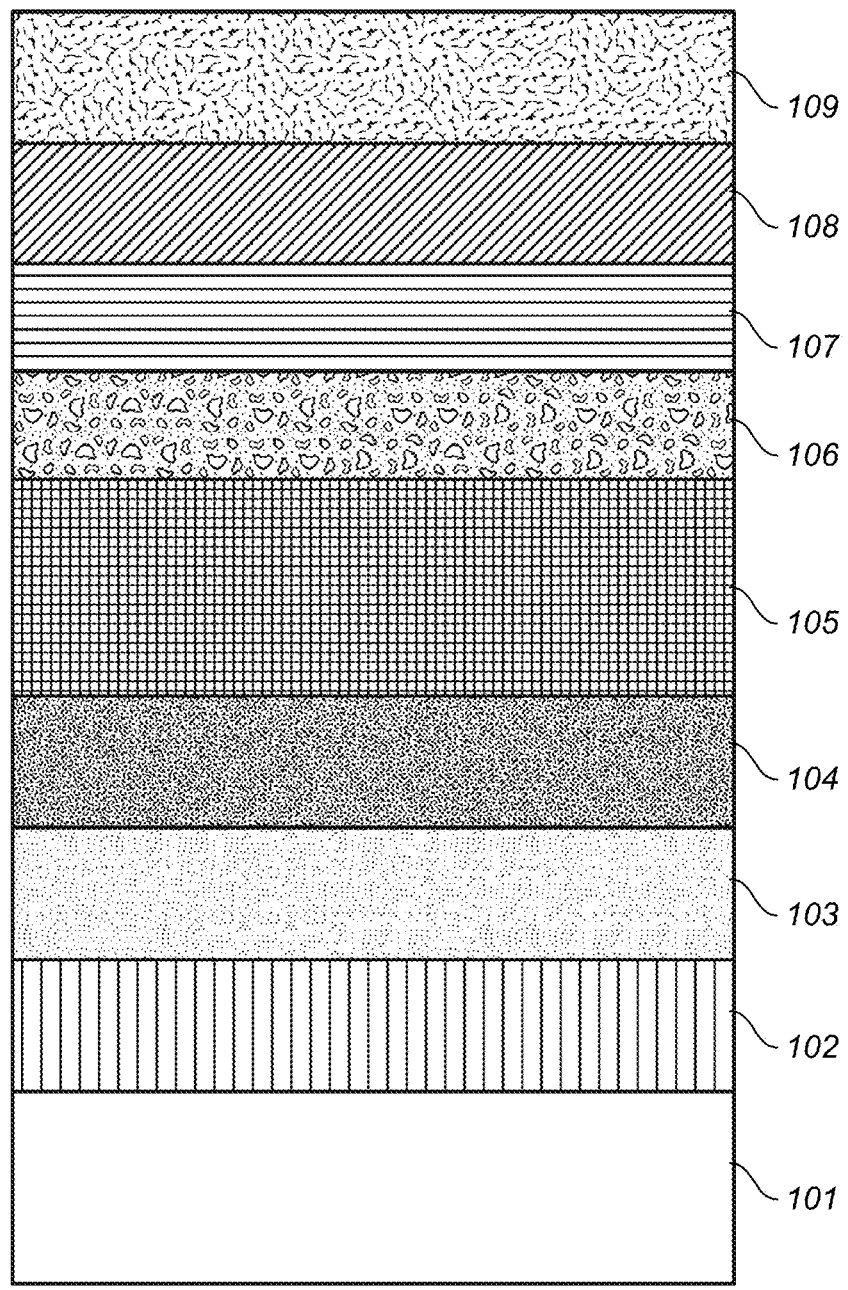
FIG. 1 depicts an example of the cross-sectional structure of a vertical magnetic recording medium according to Working Example 1 of the present invention.

FIG. 1 depicts an embodiment of a structure of a vertical magnetic recording medium. The vertical magnetic recording medium includes a buffer layer 102, a hybrid layer (103, 104), a heat sink 105, an underlayer 106, a vertical magnetic recording layer 107, an overcoat layer 108, and a lubricant layer 109 on a substrate 101. The hybrid layer includes a barrier layer 103 and a texture control layer 104.

Various flat surface substrates can be used as the substrate 101. For example, a strengthened glass substrate, a crystalline glass substrate, a Si substrate, or a thermal oxidation Si substrate can be used.

A non-crystalline Ni alloy whose main component is Ni and that includes at least one of the elements Nb and Ta can be used as the buffer layer 102. In various embodiments, the Nb added to the Ni is in the range not less than 20 at % and not more than 70 at %, and the Ta is in the range not less than 30 at % and not more than 60 at %. In addition, Zr may be added.

If the buffer layer is an amorphous layer, such as Ni—Ta or the like, as in Working Example 1 which is described later, a proper orientation of the underlayer 106 or the heat sink layer 105 is generated. Also, if the buffer layer 102 has a bcc structure with the crystal orientation conforming to that of the heat sink layer 105, the crystal orientation of the heat sink layer 105 is proper. Such as in the case of an amorphous buffer layer, and the crystal orientation of the underlayer 106 and the vertical magnetic recording layer 107 which is the FePt layer.

However, even if a material such as Cr or the like having a bcc structure is used, if the orientation planes such as Cr (110) do not conform to those of the heat sink 105, the crystal orientation of the texture control layer 104 is degraded, and the orientation of the heat sink layer 105 also is degraded. Therefore, the crystal orientation of the MgO underlayer 106 and the vertical magnetic recording layer 107 which is the FePt layer that are formed above the heat sink layer 105 are also degraded.

In one embodiment, the heat sink layer 105 is a bcc material such as Cr, Mo or the like, whose orientation can easily conform to that of the underlayer MgO, and has a thermal conductivity higher than that of the underlayer. The heat sink layer 105 may have a multi-layer configuration, with high thermal conductivity material, such as Al, Au, Cu, Ag, Ru, or alloys thereof, formed on the substrate side, and a material that conforms to the orientation on the underlayer side.

A thin film with MgO as the main component is used in the MgO underlayer 106. In various embodiments, the proportions of Mg and O are in the range not less than 40 at % and not more than 55 at % for O, and not less than 40 at % and not more than 55 at % for Mg. In addition, the same properties can be obtained if impurities are included at the rate of not more than 10 at %.

The vertical magnetic recording layer 107 has an L10 type crystal structure, and uses an alloy with FePt as the main component with grain boundaries formed from a non-magnetic material, such as C, a carbide, a nitride, an oxide, or the like. Also, elements including Ag, Au, or Cu may be added to the vertical magnetic recording layer in order to reduce the ordering temperature.

A thin film with high hardness having carbon as the main component is used as the overcoat layer 108. The lubricant layer 109 is formed thereupon.

In order to form each of the layers that are stacked on the substrate 101, various thin film forming technologies that are used for forming semiconductors, magnetic recording media, or optical recording media can be used. The DC magnetron sputtering method, the RF magnetron sputtering method, and the MBE method, and so on, are well known as thin film forming technologies. Of these, the sputtering method, for which the film forming speed is comparatively fast and the microstructure and the film thickness distribution of the thin film can be controlled, is suitable for application to mass production.

The vertical magnetic recording medium of the present working example was formed using an in-line type high speed sputter device. This device is configured from a plurality of film making process chambers, chambers for heating, and substrate insertion/discharge chambers, and each chamber can be independently evacuated. Each chamber was evacuated to a vacuum of $1 \times 10^{-4}$ Pa or lower, and the processes were carried out in sequence by moving the substrate loaded onto a carrier into each process chamber. Heating of substrates was carried out in the chambers for heating, and the temperature during heating was controlled by the power supplied to the heater and by the time. The temperature may be controlled by PID control by providing thermocouples.

An atomic force microscope (AFM) was used to evaluate the surface roughness. To evaluate the roughness, the center line average roughness (Ra) and the mean square value of the surface roughness (Rq) were used as indices.

Working Example 1, Comparative Example 1

The vertical magnetic recording medium having the barrier layer 103 and the texture control layer 104 as shown schematically in FIG. 1 was used as Working Example 1. An approximately 100 nm $Ni_{62}Ta_{38}$ layer as the buffer layer 102, an approximately 1 nm $Ni_{86}Cr_6W_8$ layer as the barrier layer 103, an approximately 1 nm MgO layer as the texture control layer 104, an approximately 30 nm Cr layer as the heat sink layer 105, an approximately 12 nm MgO layer as the underlay layer 106, an approximately 10 nm magnetic recording layer 107 with average composition $(Fe_{45}Pt_{45}Ag_{10})_{85}(SiO_2)_{15}$, and an approximately 3 nm C layer as the overcoat layer 108 were formed sequentially on the substrate 101. The film making was carried out by DC sputtering or RF sputtering. Thereafter, approximately 1 nm of lubricant material 109 was applied to the C layer.

Figure 7:
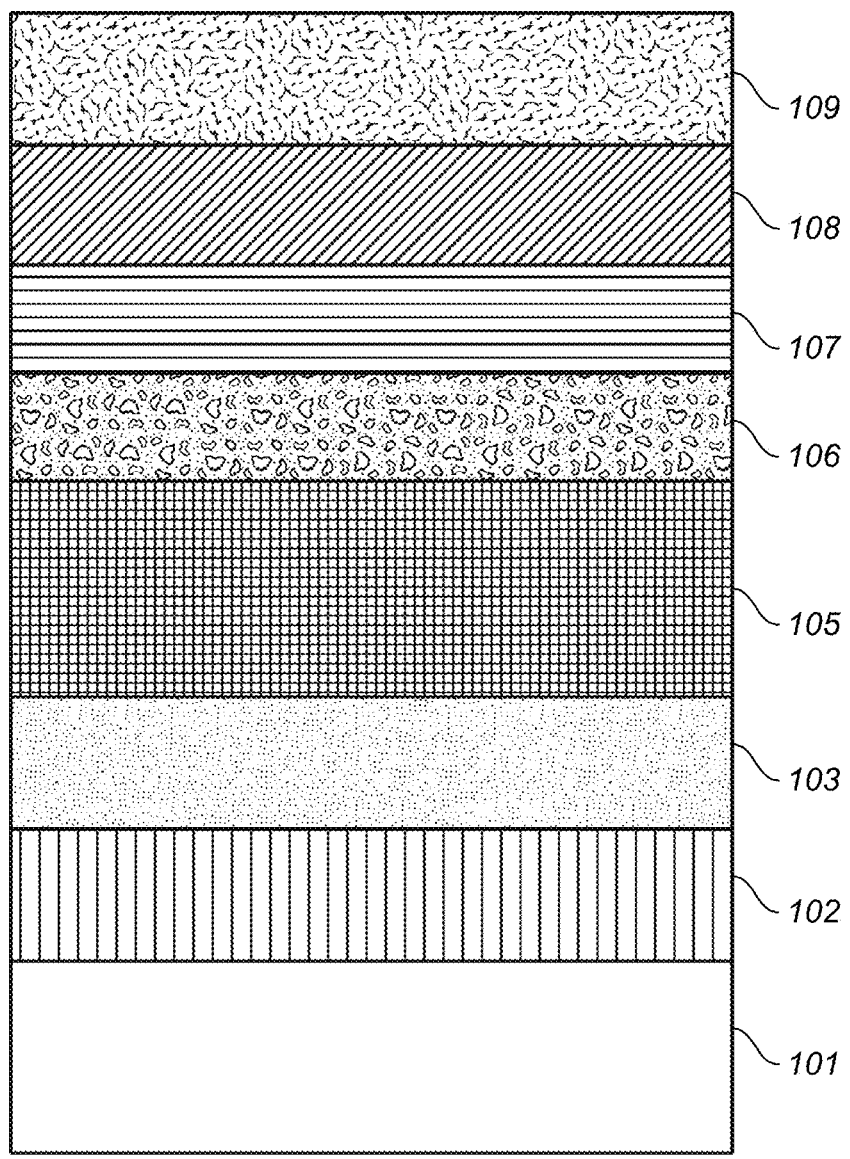
FIG. 7 depicts an example of the cross-sectional structure of a vertical magnetic recording medium according to Comparative Example 1.

A vertical magnetic recording medium with no texture control layer 104 as shown schematically in FIG. 7 was used as Comparative Example 1. An approximately 100 nm $Ni_{62}Ta_{38}$ layer as the buffer layer 102, an approximately 1 nm $Ni_{86}Cr_6W_8$ layer as the barrier layer 103, an approximately 30 nm Cr layer as the heat sink layer 105, an approximately 12 nm MgO layer as the underlayer 106, an approximately 10 nm magnetic recording layer 107 with average composition $(Fe_{45}Pt_{45}Ag_{10})_{85}(SiO_2)_{15}$, and an approximately 3 nm C layer as the overcoat layer 108 were formed in sequence on the substrate 101. The film making was carried out by DC sputtering or RF sputtering. Thereafter, approximately 1 nm of lubricant material 109 was applied to the C layer. In other respects, Comparative Example 1 was the same as Working Example 1.

Figure 8:
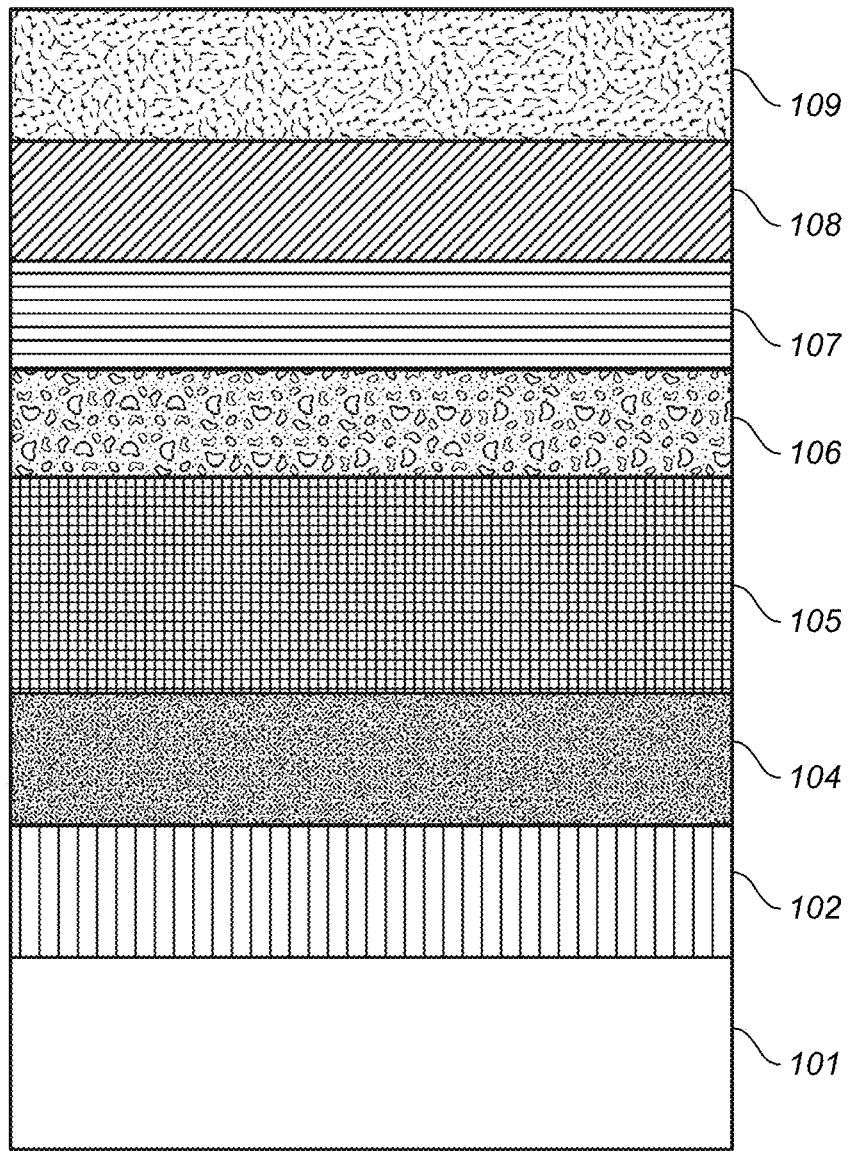
FIG. 8 depicts an example of the cross-sectional structure of a vertical magnetic recording medium according to Comparative Example 2.

A vertical magnetic recording medium with no barrier layer 103 as shown schematically in FIG. 8 was used as Comparative Example 2. An approximately 100 nm $Ni_{62}Ta_{38}$ layer as the buffer layer 102, an approximately 1 nm MgO layer as the texture control layer 104, an approximately 30 nm Cr layer as the heat sink layer 105, an approximately 12 nm MgO layer as the underlayer 106, an approximately 10 nm magnetic recording layer 107 with average composition $(Fe_{45}Pt_{45}Ag_{10})_{85}(SiO_2)_{15}$, and an approximately 3 nm C layer as the overcoat layer 108 were formed in sequence on the substrate 101. The film making was carried out by DC sputtering or RF sputtering. Thereafter, approximately 1 nm of lubricant material 109 was applied to the C layer. In other respects, Comparative Example 2 was the same as Working Example 1.

Figure 2:
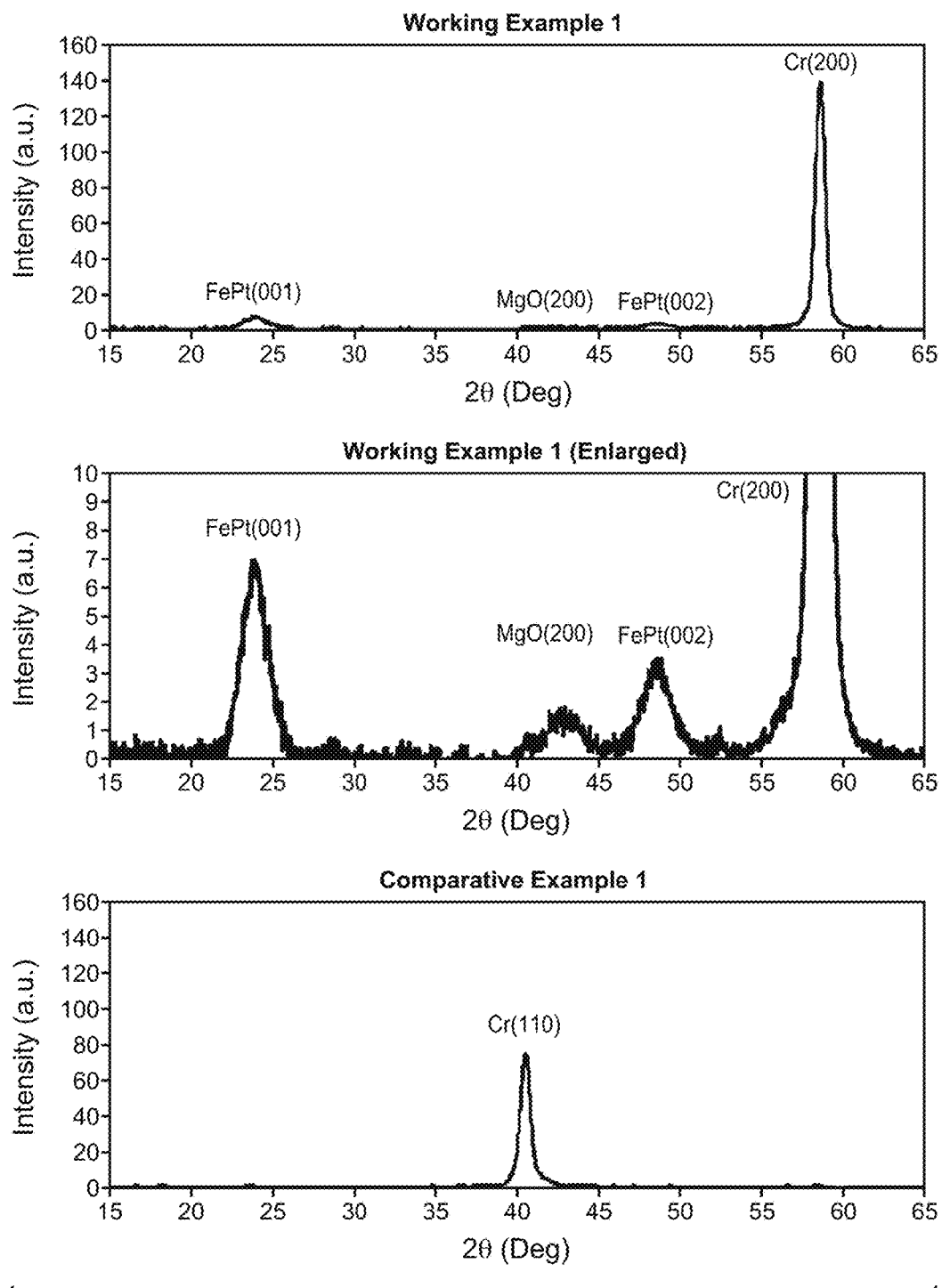
FIG. 2 depicts the results of evaluation of the crystal orientation of the vertical magnetic recording medium according to Working Example 1 of the present invention and Comparative Example 1.

FIG. 2 shows the results of measuring the crystal orientation of the medium for the working example and the comparative example. An X-ray diffraction device was used for evaluating the crystal orientation. The vertical axis shows the diffraction peak intensity of each crystal plane, and the horizontal axis shows the angle (2θ), the higher the diffraction peak strength the better the crystallinity.

From these results, compared with Comparative Example 1, it can be seen that in Working Example 1, a Cr (200) peak was obtained for the heat sink layer, and MgO (200) orientation was obtained from the underlayer formed above the Cr. As a result, it can be seen that in the magnetic recording layer also the FePt (001), (002) peaks were obtained, so the L10 order FePt alloy was formed. Also, in Working Example 1, the Cr diffraction peak was larger compared with the diffraction peaks of FePt and MgO, and the main reasons for this are because the film was thick and the crystal grain diameter was large. On the other hand, in Comparative Example 1, a Cr (110) peak was obtained, and no Cr (200) peak was obtained. In other words, it was not possible to control the orientation of the heat sink and the underlayer, so the FePt did not have L10 order.

FIGS. 3A through 3D show the results of the surface roughness of Working Example 1 and Comparative Example 2 measured with an atomic force microscope (AFM).

Figure 3A:
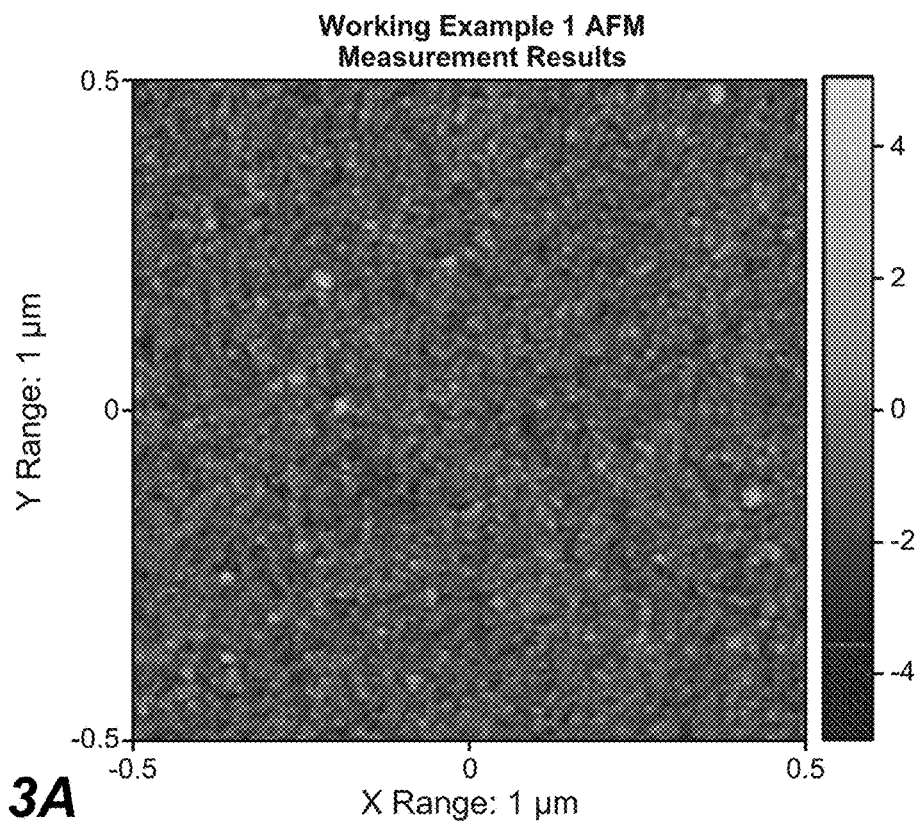
FIGS. 3A, 3B, 3C and 3D depict the results of evaluation of the surface roughness of the vertical magnetic recording medium according to the Working Examples of the present invention and Comparative Example 2.
Figure 3B:
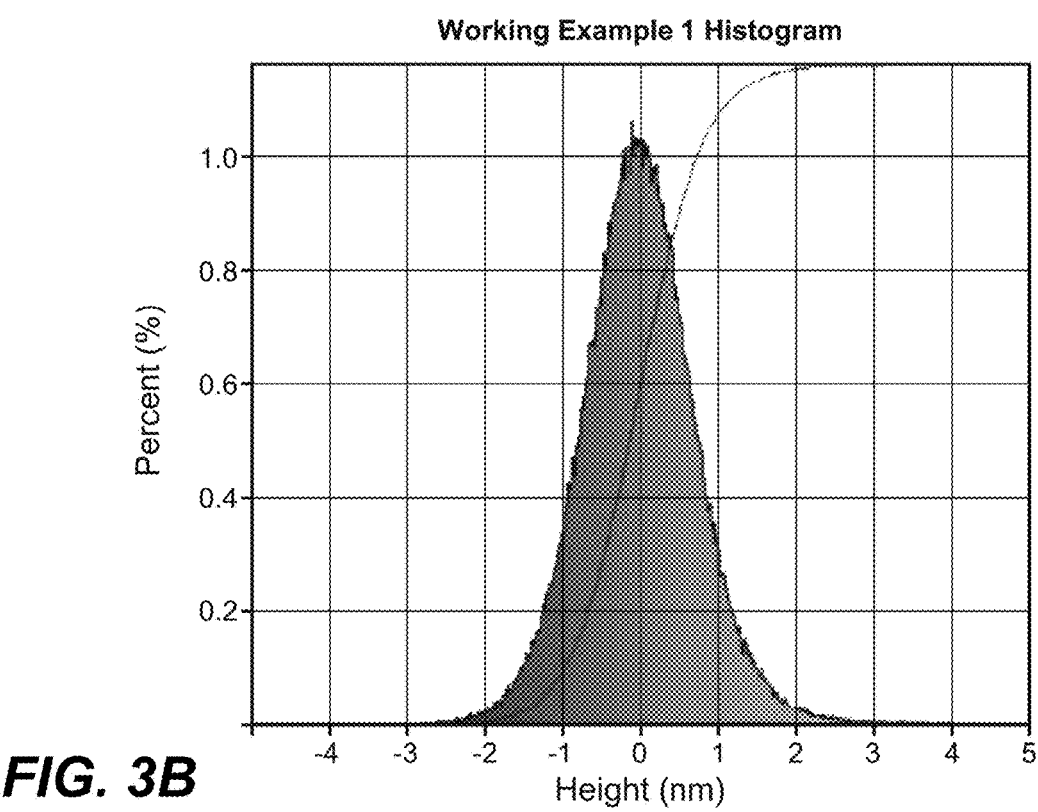
Figure 3C:
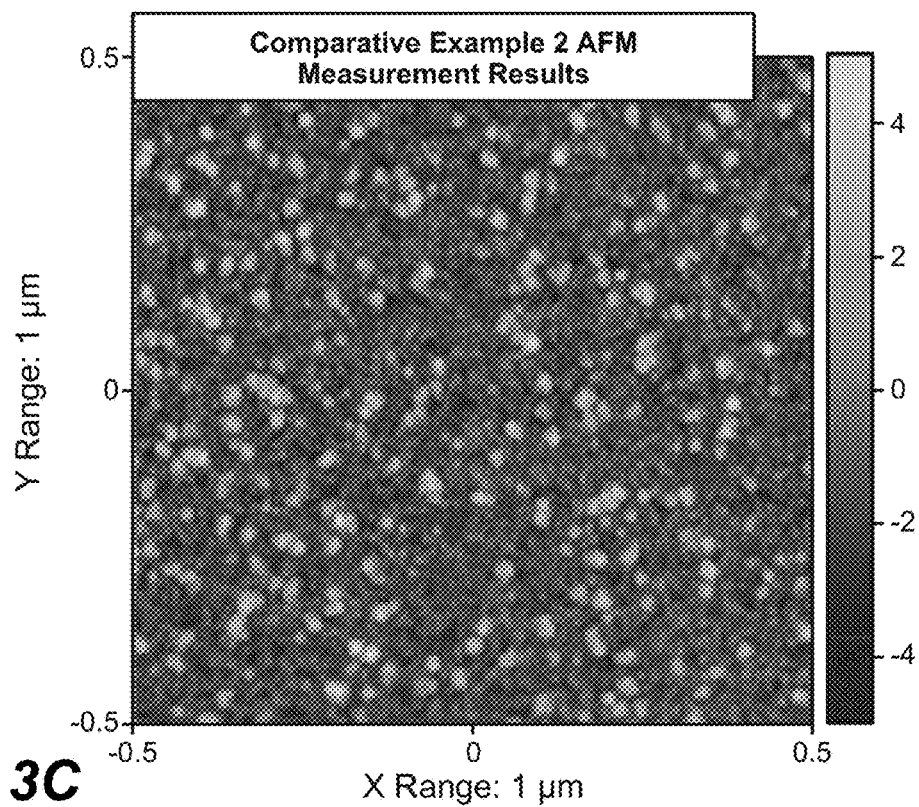
Figure 3D:
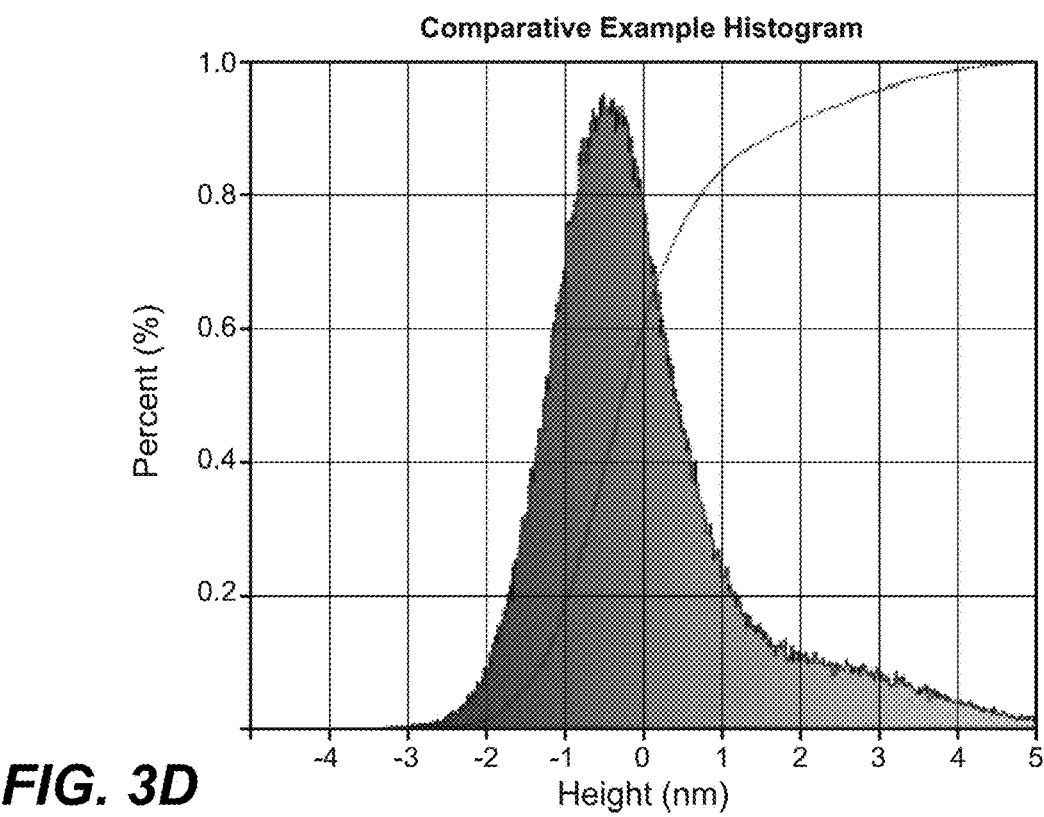

Large projections or the like were not seen on the surface of the medium of Working Example 1, as shown in FIG. 3A, and the width of the histogram in FIG. 3B is narrow. In other words, a flat surface was obtained. On the other hand, numerous projections were observed on the surface of the medium of Comparative Example 2, as can be seen in FIG. 3C. The base of the histogram in FIG. 3D is also widened on the side of large roughness. Therefore, projections were formed on the surface, which results in poor flying characteristics of a medium.

Figure 4A:
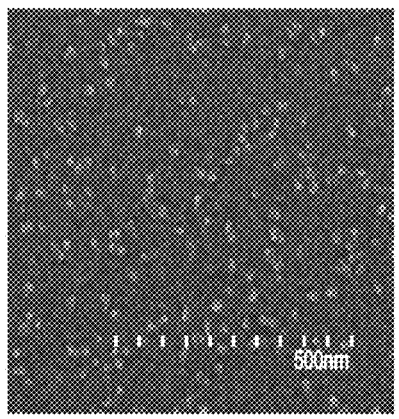
FIGS. 4A, 4B, 4C, 4D, 4E and 4F depicts the results of observation of surface projections when the barrier layer in the vertical magnetic recording medium according to Working Example 1 of the present invention is changed.
Figure 4B:
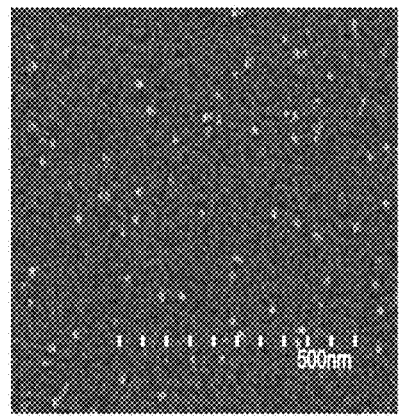
Figure 4C:
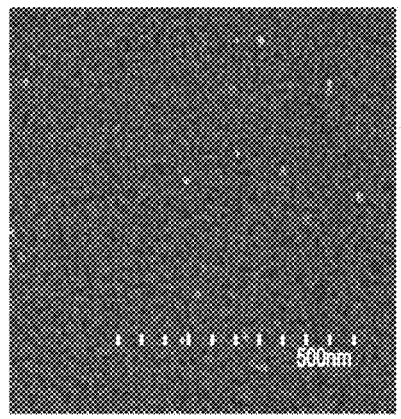
Figure 4D:
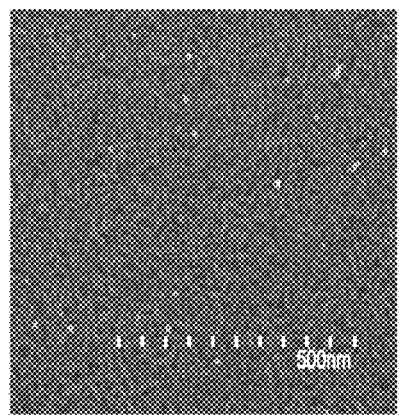
Figure 4E:
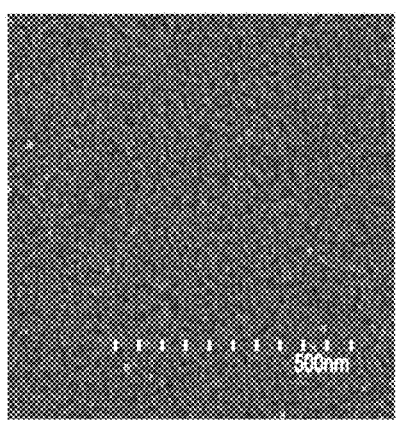
Figure 4F:
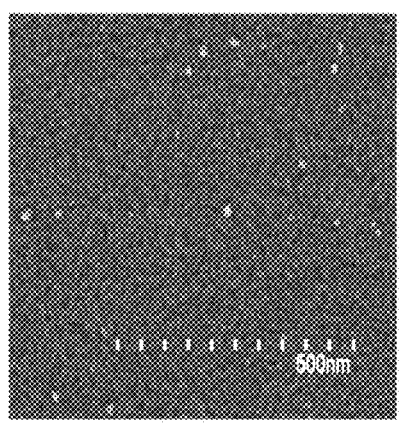

FIGS. 4A-F shows the results of observation of the surface projections of the medium using a scanning electron microscope (SEM) for cases where the thickness of the barrier layer 103 is changed from Working Example 1. In FIG. 4A where there is no barrier layer 103, many projections were observed, but in FIG. 4B where the barrier layer 103 is 0.5 nm the number of projections is reduced. When the barrier layer 103 is 0.7 nm or greater the number of projections was further reduced, and the number was lowest at 1.0 nm (FIG. 4D) and 1.2 nm (FIG. 4E). When the barrier layer 103 exceeds 1.5 nm (FIG. 4F), the number of projections increased.

Figure 5:
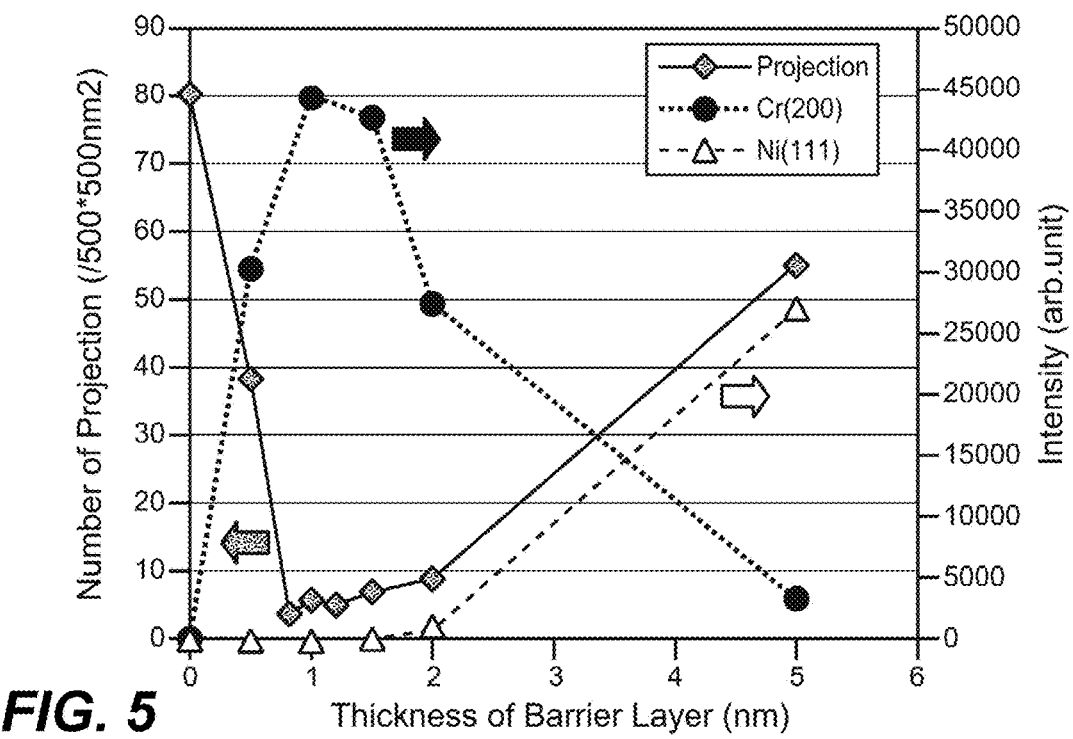
FIG. 5 depicts the results of evaluation of crystal orientation and surface projections when the film thickness of the barrier layer in the vertical magnetic recording medium according to Working Example 1 of the present invention is changed.

FIG. 5 shows the number of projections per unit area (Projection), the integrated intensity of the Cr (200) peak, and the integrated intensity of the Ni (111) peak. From these results it can be seen that when the barrier layer is not less than 0.5 nm and not more than 2 nm, the number of projections is reduced, and Cr (200) orientation is obtained. When the barrier layer is not less than 0.7 nm and not more than 1.5 nm, it can be seen that the number of projections is further reduced and the Cr (200) orientation is proper.

Figure 6:
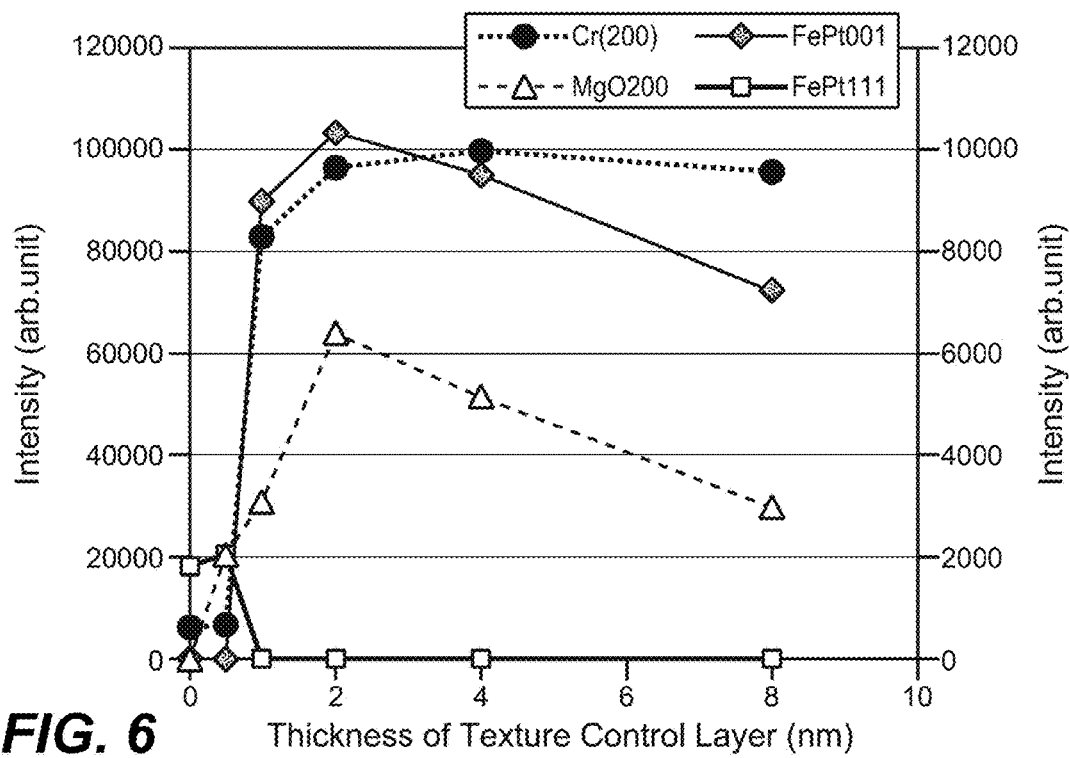
FIG. 6 depicts the results of evaluation of crystal orientation when the film thickness of the texture control layer in the vertical magnetic recording medium according to Working Example 1 of the present invention is changed.

FIG. 6 shows the results for the orientation of each layer when the thickness of the texture control layer 104 is changed from the medium of Working Example 1, as measured with an X-ray diffraction device (XRD). When there is no texture control layer 104, orientation of the Cr heat sink and the MgO underlayer formed thereupon is not obtained, so no diffraction peak was seen for FePt (001), but a FePt (111) diffraction peak was observed for crystal planes formed at an incline. When the texture control layer is 0.5 nm, the orientation of the MgO underlayer is slightly improved. When the texture control layer 104 is 1.0 nm or higher, the diffraction peak of the Cr layer and MgO layer is improved, and a (001) diffraction peak indicating L10 order is observed in the FePt formed above the underlayer. Therefore, when the texture control layer 104 is not less than 0.5 nm and not more than 4 nm, good properties are exhibited, and when it is not less than 1.0 nm and not more than 2 nm the properties are particularly good.

Working Examples 2 Through 13

Cases in which the material of the barrier layer 103 or the texture control layer 104 was changed from Working Example 1 were investigated. Table 1 summarizes the results of Working Example 2 through Working Example 13.

The number of surface projections in the table is the number of projections per unit area observed by SEM, wherein a medium having a smaller number of projections has better flying characteristics as compared to a medium having a higher number of projections. The $L1_0$ order index is the integrated intensity ratio of the (001) diffraction peak and the (002) diffraction peak, $I_{001}/I_{002}$, wherein the medium with the larger $L1_0$ order index has the higher proportion of ordering, which is desirable.

From these results it can be seen that in Working Examples 2 through 8, the Cr (200) diffraction peak is obtained from the Cr heat sink layer, similar to Working Example 1, and the MgO (200) diffraction peak was observed from the MgO underlayer formed above the Cr. As a result the FePt (001), (002) diffraction peaks were obtained in the magnetic recording layer, so it can be seen that L10 order FePt alloy was formed. In this way, in Working Examples 2 through 13, the integrated intensity ratio of the (001) diffraction peak and the (002) diffraction peak $I_{001}/I_{002}$ was 1.3 or higher, so good crystal orientation was obtained, and the number of surface projections was 9 or fewer indicating good flying characteristics.

Of these, in Working Examples 2 through 8 the integrated intensity ratio of the (001) diffraction peak and the (002) diffraction peak $I_{001}/I_{002}$ was 1.4 or higher, so particularly good crystal orientation was obtained, and the number of surface projections was 5 or fewer indicating a particularly good flying characteristics.

As demonstrated above, the same good properties were obtained when alloy materials were used as the barrier layer that includes any of Cr, Co, Fe, or Ni as the main component of the material of the barrier layer instead of Ni—Cr—W, and any of the remainder of these elements and/or W, Mo, Ru as the additive component.

Also, the same good properties were obtained when the oxides Ta—O, SiO$_2$, Si—O, or Ti—O were used instead of MgO as the texture control layer. Other oxide materials may also be used.

Comparative Examples 3 Through 9

Cases in which the material of the barrier layer 103 and/or the texture control layer 104 in Working Example 1 was changed to other materials were examined. Table 2 summarizes the results for Comparative Examples 3 through 9.

When a material not used in the working examples was used in the barrier layer, as in Comparative Examples 3 and 4, the number of surface projections was extremely large, and the flying characteristics were very poor. Therefore, the integrated intensity ratio of the (001) diffraction peak and the (002) diffraction peak $I_{001}/I_{002}$ was large, but the properties obtained were insufficient for practical purposes.

When a material that was not used in the working examples was used in the texture control layer, as in Comparative Examples 5 through 7, the integrated intensity ratio of the (001) diffraction peak and the (002) diffraction peak $I_{001}/I_{002}$ was close to 0, so the orientation was significantly degraded. From the above, it can be seen that the number of surface projections was quite large, the flying characteristics were quite poor, and the L10 order was insufficient, so the properties obtained were insufficient for practical purposes.

In Comparative Examples 8 and 9, the materials of the barrier layer and the texture control layer were not appropriate, so the number of surface projections was extremely large, and the flying characteristics were very poor. The integrated intensity ratio of the (001) diffraction peak and the (002) diffraction peak $I_{001}/I_{002}$ was close to 0, so the properties obtained were insufficient for practical purposes.

TABLE 1

| | Barrier layer | Texture control layer | No. surface projections | $I_{001}/I_{002}$ |
|---|---|---|---|---|
| Working Example 1 | NiCrW (1 nm) | MgO (1 nm) | 3 | 1.5 |
| Working Example 2 | Ni—W (1 nm) | MgO (1 nm) | 3 | 1.5 |
| Working Example 3 | Cr—W (1 nm) | MgO (1 nm) | 4 | 1.5 |
| Working Example 4 | Ni—Cr (1 nm) | MgO (1 nm) | 4 | 1.5 |
| Working Example 5 | Cr—Co (1 nm) | MgO (1 nm) | 5 | 1.5 |
| Working Example 6 | NiCrW (1 nm) | Ta—O (1 nm) | 3 | 1.3 |
| Working Example 7 | NiCrW (1 nm) | SiO2 (1 nm) | 3 | 1.4 |
| Working Example 8 | NiCrW (1 nm) | Ti—O (1 nm) | 3 | 1.4 |
| Working Example 9 | Cr—Mo (1 nm) | MgO (1 nm) | 7 | 1.4 |
| Working Example 10 | Ni—Ru (1 nm) | MgO (1 nm) | 9 | 1.3 |
| Working Example 11 | Mo—W (1 nm) | MgO (1 nm) | 7 | 1.4 |
| Working Example 12 | Co—Ru (1 nm) | MgO (1 nm) | 8 | 1.3 |
| Working Example 13 | Ni—Mo (1 nm) | MgO (1 nm) | 6 | 1.3 |

TABLE 2

| | Barrier layer | Texture control layer | No. surface projections | $I_{001}/I_{002}$ |
|---|---|---|---|---|
| Comparative Example 3 | Ta (1 nm) | MgO (1 nm) | 55 | 1.3 |
| Comparative Example 4 | Nb (1 nm) | MgO (1 nm) | 37 | 1.3 |
| Comparative Example 5 | NiCrW (1 nm) | Mg (1 nm) | 10 | 0.3 |
| Comparative Example 6 | NiCrW (1 nm) | Pt (1 nm) | 11 | 0 |
| Comparative Example 7 | NiCrW (1 nm) | Cr (1 nm) | 9 | 0 |
| Comparative Example 8 | MgO (1 nm) | NiCrW (1 nm) | 72 | 0 |
| Comparative Example 9 | SiO2 (1 nm) | W (1 nm) | 63 | 0.3 |

The layer configuration, manufacturing method, material, evaluation method, and so on, that are not stated for the working examples and the comparative examples were the same as for the other working examples.

Figure 9A:
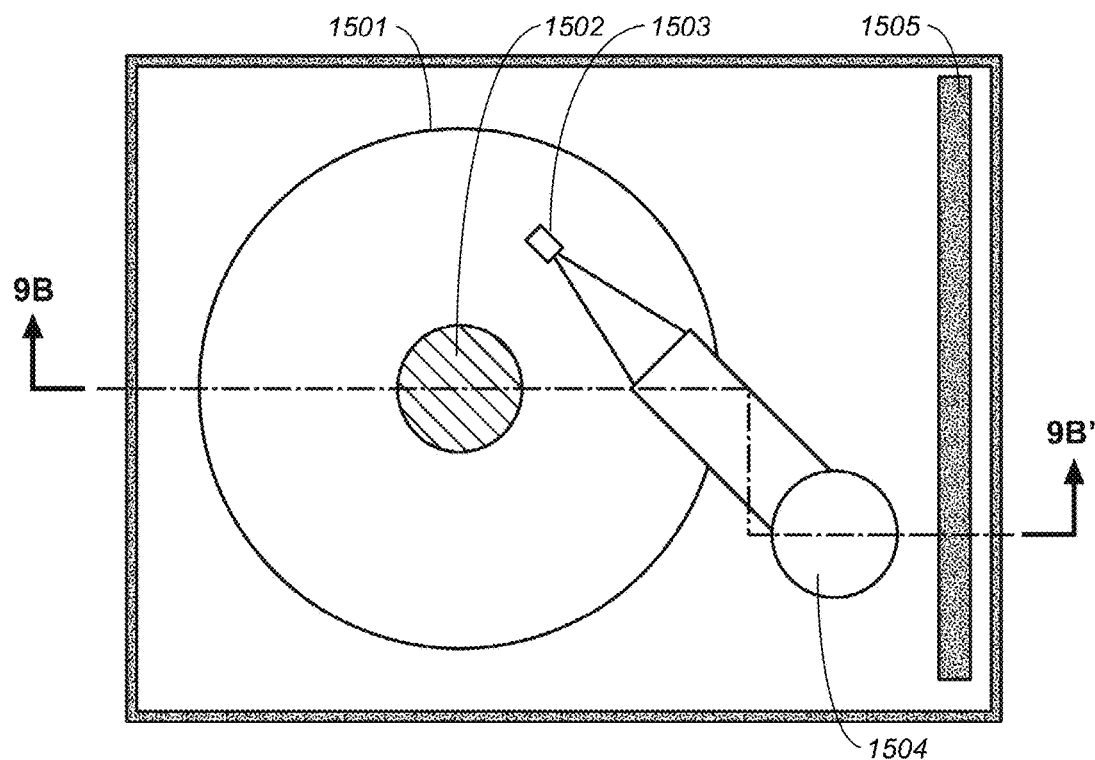
FIGS. 9A, 9B, 9C and 9D depict examples of the configuration of a magnetic recording device according to the present invention.
Figure 9B:
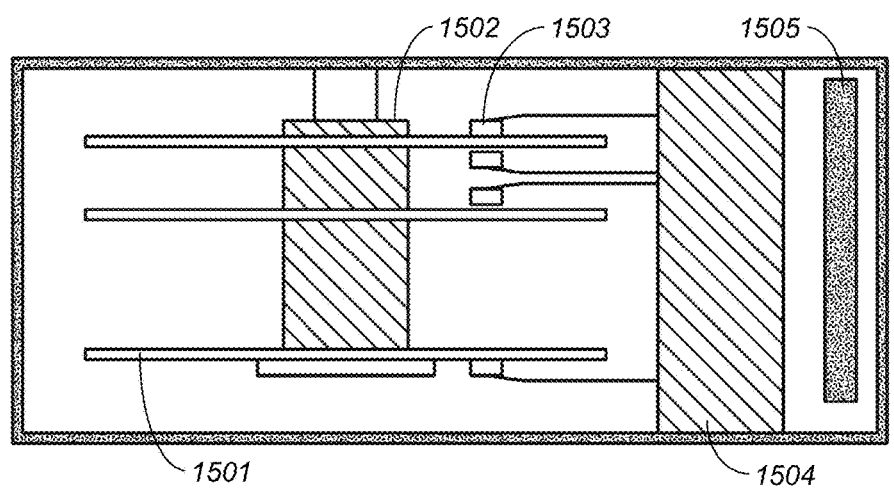
Figure 9C:
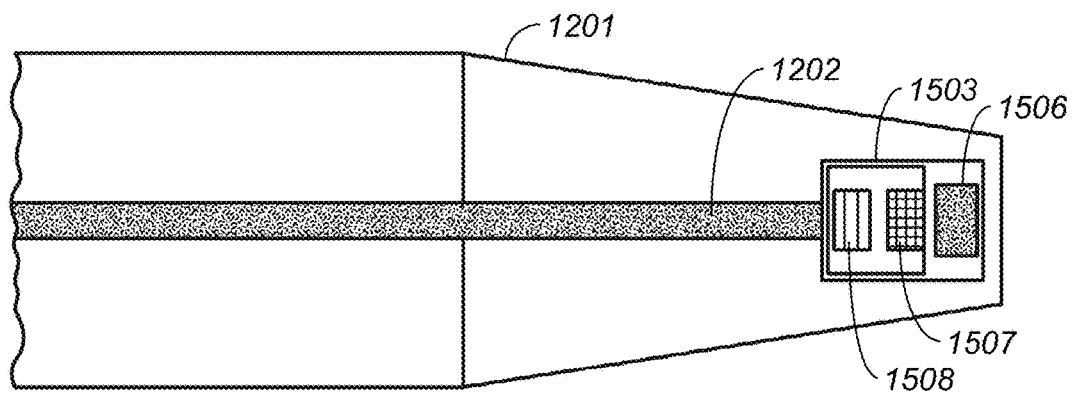
Figure 9D:
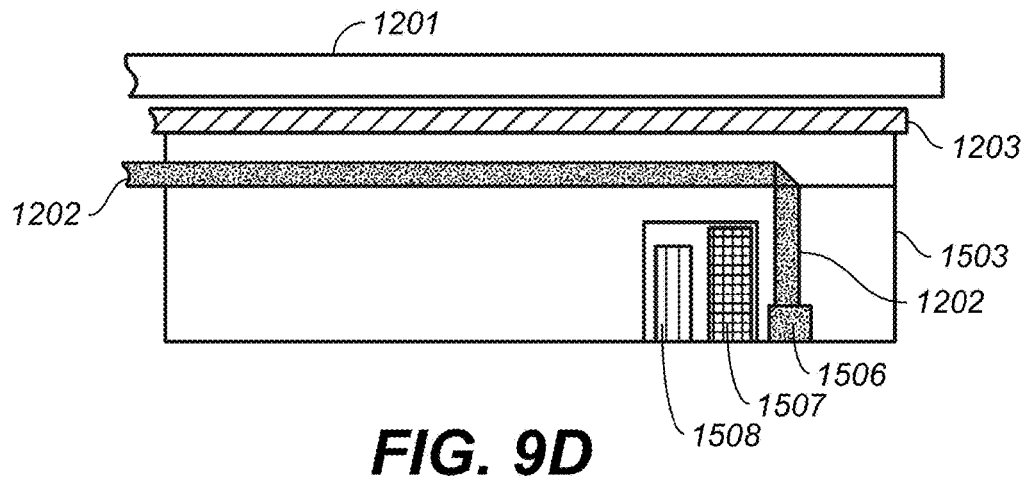

FIGS. 9A-D schematically shows a magnetic recording device according to an embodiment of the present invention. FIG. 9A is a schematic plan view, and FIG. 9B is a section view at A-A'. FIG. 9C is a schematic view of a head, and FIG. 9D is a schematic view of the main parts of the head viewed from the side. This device includes a vertical magnetic recording medium 1501, a drive unit 1502 that drives the vertical magnetic recording medium 1501, a magnetic head flying slider 1503, magnetic head drive means 1504, and magnetic recording and reproduction signal processing means 1505. The magnetic head is a separate recording and reproduction type magnetic head formed on the magnetic head slider; the recording head includes means for forming a magnetic field 1507, and energy irradiation means 1506 that uses near-field light. In addition, the magnetic head includes detection means 1508 for detecting the reproduction current, for reproducing the recorded bits. The near-field light is supplied to the energy irradiation means 1506 that uses near-field light via an optical conduction path 1202 formed on a suspension 1201. In order to improve the accuracy of positioning, the flying slider 1503 is installed on the suspension via a flexure 1203.

Next, the heat and magnetic properties during recording were investigated. The wavelength of the light source was 780 nm, and the vertical magnetic recording medium 1501 with the structure shown in FIG. 1 was used.

In addition, the medium shown in Working Example 1 was incorporated into the magnetic recording device described above, and after confirming that the head was flying stably with a fly height of 4 nm, recording was carried out using the head on which the energy irradiation means using near-field light was mounted. The recorded signal was reproduced, and it was possible to form domains of about 25 nm in the line density direction and 50 nm in the track width direction, and even when recording and reproduction was repeated, stable fly properties and recording and reproduction properties were obtained.

The layer configuration, manufacturing method, materials, evaluation methods, and so on that are not described in this working example are the same as the other working examples.

Example embodiments of the subject matter are thus described. Although various embodiments of the have been described in a language specific to structural features and/or methodological acts, it is to be understood that the appended claims are not necessarily limited to the specific features or acts described above. Rather, the specific features and acts described above are disclosed as example forms of implementing the claims and their equivalents. Moreover, examples and embodiments described herein may be implemented alone or in various combinations with one another.

The invention claimed is:

1. A magnetic recording medium comprising:
a substrate;
an amorphous or a bcc material buffer layer whose component is Nickel Tantalum (NiTa), the NiTa having a Ta concentration between 30% and 60%;
a hybrid layer comprising:
a barrier layer, wherein said barrier layer comprises a component selected from the group consisting of Co, Fe, and mixtures thereof; and
a texture control layer, wherein said texture control layer has magnesium oxide (MgO) as its component;
wherein said barrier layer and said texture control layer are in direct physical contact with one another, wherein said hybrid layer is separated from said substrate by said amorphous or said bcc material buffer layer, and wherein said barrier layer is in direct physical contact with said amorphous or said bcc material buffer layer;
a heat sink layer having a thermal conductivity formed over said hybrid layer;
an under layer having a thermal conductivity formed over said heat sink layer, wherein said under layer has magnesium oxide (MgO) as its component; and
a perpendicular recording layer formed over said under layer, such that said hybrid layer is separated from said under layer and said perpendicular recording layer by said heat sink layer, and said heat sink layer is separated from said perpendicular recording layer by said under layer and in direct physical contact with said texture control layer of said hybrid layer and said under layer;
wherein the thermal conductivity of the heat sink layer is greater than that of the under layer.

2. The magnetic recording medium of claim 1, wherein a thickness of said barrier layer is in a range of 0.5-2 nm.

3. The magnetic recording medium of claim 1, wherein a thickness of said texture control layer is in a range of 0.5-4 nm.

4. The magnetic recording medium of claim 1, wherein said heat sink layer is a bcc material.

5. The magnetic recording medium of claim 1, wherein said heat sink layer is chromium (Cr).

6. The magnetic recording medium of claim 1, wherein said barrier layer comprises an additive component selected from the group consisting of W, Mo, or Ru.

7. The magnetic recording medium of claim 1, wherein said perpendicular recording layer is $L1_0$-order alloy, FePt—X, wherein the X comprises at least one of carbon, a carbide, a nitride, and an oxide as grain boundaries.

8. The magnetic recording medium of claim 1, wherein said heat sink layer has Chromium (Cr) as its component and wherein said texture control layer and said heat sink layer are in direct physical contact with one another.

9. The magnetic recording medium of claim 1, wherein said heat sink layer has Molybdenum (Mo) as its component and wherein said texture control layer and said heat sink layer are in direct physical contact with one another.

10. A hard disk drive, comprising:
a magnetic recording medium comprising:
a substrate;
an amorphous or a bcc material buffer layer whose component is Nickel Tantalum (NiTa), the NiTa having a Ta concentration between 30% and 60%;
a hybrid layer comprising:
a barrier layer, wherein said barrier layer comprises a component selected from a group consisting of Co, Fe, and mixtures thereof;
and a texture control layer, wherein said texture control layer has magnesium oxide (MgO) as its component;
wherein said barrier layer and said texture control layer are in direct physical contact with one another, wherein said hybrid layer is separated from said substrate by said amorphous or said bcc material buffer layer and wherein said barrier layer is in direct physical contact with said amorphous or said bcc material buffer layer;
a heat sink layer having a thermal conductivity formed over said hybrid layer;
an under layer having a thermal conductivity formed over said heat sink layer, wherein said under layer has magnesium oxide (MgO) as its component; and
a perpendicular recording layer formed over said under layer, such that said hybrid layer is separated from said under layer and perpendicular recording layer by said heat sink layer, and said heat sink layer is separated from said perpendicular recording layer by said under layer and in direct physical contact with said texture control layer of said hybrid layer and said under layer; wherein
the thermal conductivity of the heat sink layer is greater than that of the under layer.

11. The hard disk drive of claim 10, wherein a thickness of said barrier layer is in a range of 0.5-2 nm.

12. The hard disk drive of claim 10, wherein a thickness of said texture control layer is in a range of 0.5-4 nm.

13. The hard disk drive of claim 10, wherein said barrier layer comprises an additive component selected from the group consisting of W, Mo or Ru.

14. The hard disk drive of claim 10, wherein said heat sink layer is chromium (Cr).

15. The hard disk drive of claim 10, wherein said perpendicular recording layer is $L1_0$-order alloy, FePt—X, wherein the X comprises at least one of a carbon, a carbide, a nitride, and an oxide as grain boundaries.

* * * * *